United States Patent [19]
Taguchi

[11] 3,732,519
[45] May 8, 1973

[54] SEMICONDUCTOR GAS DETECTING DEVICE

[76] Inventor: Naoyoshi Taguchi, 6-8, 2-chome Hyuga, Tarumi-ku, Kobe, Japan

[22] Filed: Sept. 23, 1970

[21] Appl. No.: 74,749

[52] U.S. Cl. ............................................. 338/34
[51] Int. Cl. ..................................... H01c 13/00
[58] Field of Search ................. 338/34; 340/237; 200/61.03

[56] References Cited

UNITED STATES PATENTS

| | | | |
|---|---|---|---|
| 3,625,756 | 12/1971 | Taguchi | 338/34 |
| 3,603,954 | 9/1971 | Takeuchi | 338/34 |
| 3,027,552 | 3/1962 | Landis | 340/237 |
| 3,144,850 | 8/1964 | Rosenberg | 340/237 |

Primary Examiner—R. Skudy
Attorney—Eugene E. Geoffrey, Jr.

[57] ABSTRACT

A gas detecting device formed of a porous, highly permeable, metal oxide semiconductor formed by mixing semiconductor particles with inorganic materials which will render the semiconductor highly porous or by intermixing the semiconductor with materials which can be evaporated or otherwise removed by heating to a temperature below the sintering temperature of the semiconductor. The resultant semiconductor material is contained within a suitable housing that will permit gases to flow readily through the semiconductor and appropriate electrodes are affixed to the semiconductor to measure a change in resistance in the presence of reducing gases. Heating means may be utilized to stabilize the resistance of the semiconductor material during operation and such heating means may comprise at least one of the electrodes.

7 Claims, 10 Drawing Figures

PATENTED MAY 8 1973

INVENTOR.
NAOYOSHI TAGUCHI
BY
ATTORNEY

SEMICONDUCTOR GAS DETECTING DEVICE

This invention relates to a gas detecting device and, more specifically, to a gas detector embodying a metal oxide semiconductor and method of manufacturing having a resistivity which undergoes a substantial change when the semiconductor contacts a reducing gas, such as hydrogen, propane, butane or smoke.

Prior gas detecting devices utilized metal oxide semiconductors for adsorbing gases wherein the semiconductor was sintered after being formed in a predetermined configuration. Preshaped metal oxide semiconductors were sintered in order to improve the mechanical strength but in so doing the material enters a semi-molten state which reduces its air permeability with the result that its gas adsorption characteristics are substantially reduced and a severe reduction of sensitivity occurs.

One object of the invention resides in the provision of a novel improved gas detecting device embodying a metal oxide semiconductor of substantial mechanical strength and having a high degree of air permeability which permits gases to readily permeate the structure and thereby affords a relatively high degree of sensitivity.

Another object of the invention resides in the provision of a novel and improved method for manufacturing gas detecting devices embodying metal oxide semiconductors of substantial mechanical strength and having a high degree of air permeability.

The device in accordance with the invention includes a porous metal oxide semiconductor block having a high degree of permeability and exhibiting a substantial change in electroconductivity in the presence of reducing gases and at least two electrodes electrically contacting two separate portions of the block in order to detect changes in electroconductivity.

In the manufacture of the device in accordance with the invention, a powdered metal oxide semiconductor material having an electroconductivity which will undergo substantial change in the presence of reducing gases is shaped into the form of a block at a low temperature which neither fuses nor sinters the powder and at least one pair of electrodes which are secured to separate portions of the block in order to measure changes in electroconductivity.

The above and other objects and advantages of the invention will become more apparent from the following description and the accompanying drawings forming part of this application.

IN THE DRAWINGS

Figure 1:
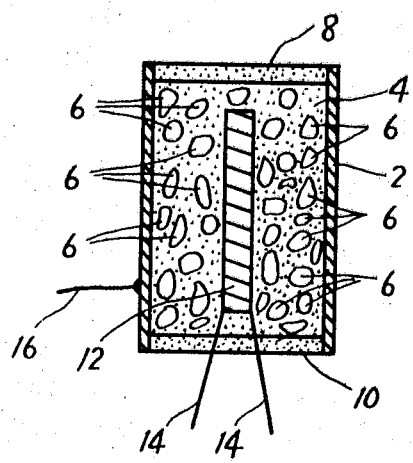
FIG. 1 is a vertical cross-sectional view of one embodiment of a gas detecting device in accordance with the invention.

The embodiment of the invention illustrated in FIG. 1 includes a cylindrical metal casing 2 serving as one electrode and enclosing a preshaped block of a metal oxide semiconductor material 4 having quartz particles 6 dispersed therein. The metal oxide semiconductor material 4 may be formed of one of the reduction type semiconductors, such as $SnO_2$, $ZnO$, $Fe_2O_3$ or $TiO_2$. These materials increase their electroconductivities in response to adsorption of reducing gases. If desired, an oxidation type semiconductor, such as $NiO$, $CoO$ or $Cr_2O_3$, may be utilized in which event the conductivity will decrease in the presence of a reducing gas.

Particles 6 dispersed throughout the semiconductor may be formed of alumina or other inorganic substance in place of quartz. The particles 6 are preferably coarser than the metal oxide semiconductor powder 4 and should have relatively rough, uneven surfaces. The ends of the casing 2 are closed by covers 8 and 10 formed of a permeable material to permit gases to flow therethrough. A heater 12 formed of resistive wire wound about an insulator is embedded in the semiconductor and conductors 14 connected to the ends of the heater extend outwardly through the cover 10. The heater 12 also serves as a second electrode.

Figure 10:
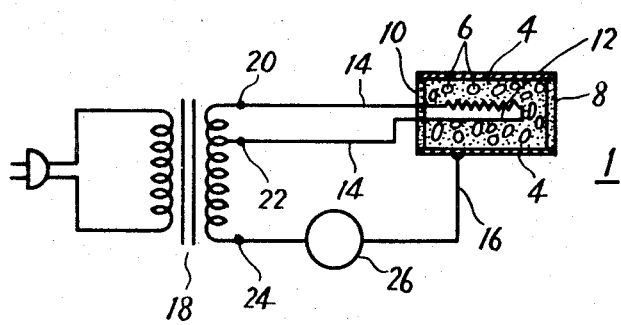
FIG. 10 is a circuit diagram of one embodiment in an alarm system embodying a gas detecting device in accordance with the invention.

When the metal oxide semiconductor 4 is of a reduction type, the gas detecting device would be connected as illustrated in FIG. 10. More specifically, the terminals 20 and 22 of the secondary winding on transformer 18 are connected to the conductors 14 of the heater 12. A third terminal 24 on the secondary winding is connected through a buzzer or other alarm 26 to a conductor 16 electrically connected to the casing 2. The primary winding of the transformer 18 is connected to a suitable power supply. The transformer 18 is designed in such a manner that a sufficient voltage will be produced between the terminals 20 and 22 to cause a current of sufficient magnitude to flow through the heater 12 to heat the semiconductor material to a temperature of the order of 100° C. to 200° C. Heating of the semiconductor stabilizes its resistance during operation and also increases the change in resistance when the detector is placed in an atmosphere containing a predetermined concentration of a gas to be detected.

When the gas detecting device 1 is not exposed to a reducing gas, the resistance of the metal oxide semiconductor material 4 will be relatively large with the result that a current will flow through the buzzer 26 which is too small to activate the buzzer. When the detecting device 1 is exposed to a reducing gas, the resistance of the semiconductor 4 decreases and this in turn substantially increases the current flowing through the buzzer and energizes the buzzer to sound an alarm.

When the metal oxide semiconductor 4 is of the oxidation type, it increases its resistance when exposed to a reducing gas. Under these conditions, a relay would be utilized having contacts which close when the current through the relay is small. The coil of the relay would be connected between the terminal 24 of the secondary winding on the transformer 18 and the conductor 16 of the gas detecting device 1. The buzzer 26 would then be connected to a suitable power supply through the contacts of the relay. It is, of course, understood that the metal oxide semiconductor material, whether of the reduction type or oxidation type, returns to its normal resistance when the contaminating gas is removed from the ambient atmosphere.

Inasmuch as the particles 6 in the gas detecting device in accordance with the invention have relatively rough and uneven surfaces, the effective area of the semiconductor material 4 which can adsorb gases is greatly increased with the result that the sensitivity of the device is substantially increased.

If desired, the particles 6 may be replaced by holes or voids to provide further improvement in sensitivity. To effect this end, particles of starch, such as flour, crushed rice, or dog-tooth violet starch, are mixed with a semiconductor powder and the mixture is shaped under pressure and then heated to a sufficient temperature to burn away or evaporate the starch and at the same time prevent sintering of the material. This procedure causes pores to be formed in the semiconductor block so that the effective gas absorbing area is substantially increased with an attendant increase in its gas detection sensitivity.

Figure 3:
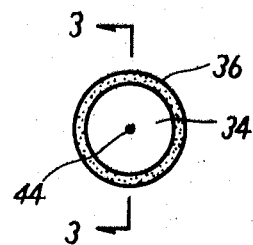
FIG. 3 is a cross-sectional view of FIG. 2 taken along the line 3—3 thereof.
Figure 2:
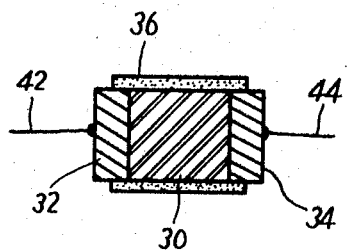
FIG. 2 is a side elevational view of a modified embodiment of a gas detecting device in accordance with the invention.

FIGS. 2 and 3 show the modified embodiment of the invention and utilize a central body 30 of ceramic or other suitable material having electrodes 32 and 34 on opposite sides thereof. A porous metal oxide semiconductor film 36 is formed about the entire exposed surface of the body 30 as well as at least part of the electrodes 32 and 34. Conductors 42 and 44 are connected to the electrodes 32 and 34, respectively.

The manufacture of the porous metal oxide semiconductor material layer 36 will be described utilizing a typical material, such as $SnO_2$ as the semiconductor. One gram of $SnCl_2$ is added to 8 grams stearic acid as a binder. Though the weight ratio is not critical, fumes produces by $SnCl_4$ when too small an amount of stearic acid is utilized will adversely affect the health of the operators. The mixture is then heated to produce a dark brown liquid and the liquid is then applied to the entire surface of the body 30 and part of the electrodes 32 and 34. The structure is then baked in air to produce the metal oxide semiconductor layer 36 consisting of $SnO_2$, as illustrated in the drawings. If desired, the liquid may be sprayed on a preheated base 30. The resultant metal oxide semiconductor layer 36 consisting of $SnO_2$ will have a large number of pores formed by the stearic acid which has a high molecular weight when $SnO_2$ crystals are produced. In addition to the stearic acid, other binders may be utilized which have high molecular weights and can be burned away as, for instance, wax, sugar, polyvinyl alcohol or acrylic resins.

The foregoing embodiment of the invention has a very large change in resistance between electrodes 32 and 34 when subjected to a gas contaminated atmosphere with the result that its sensitivity is high. This substantial increase in sensitivity results from the fact that the layer 36 is extremely porous and has a very large absorbing area. Furthermore, the metal oxide layer 36 has sufficient mechanical strength since it is carried by the base 30. Although a heater for heating the semiconductor 36 has not been illustrated in this embodiment of the invention, a suitable heater may be employed to heat the layer 36, if desired.

Figure 5:
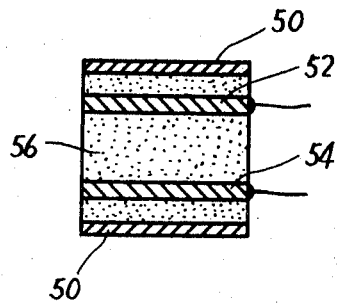
FIG. 5 is a cross-sectional view of FIG. 4 taken along the line 5—5 thereof.
Figure 4:
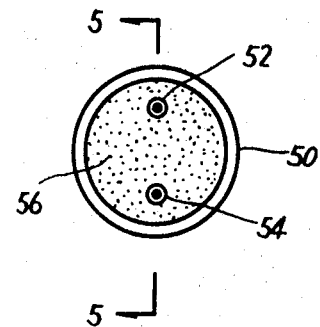
FIG. 4 is a side elevational view of still another embodiment of a gas detecting device in accordance with the invention.

FIGS. 4 and 5 illustrate another embodiment of a gas detecting device in accordance with the invention. In this embodiment, a metal casing 50 surrounds a metal oxide semiconductor block 56 which is merely formed by pressure shaping a powdered metal oxide semiconductor material in which electrodes 52 and 54 have been embedded.

Since the semiconductor block 56 of this embodiment is merely formed by press-shaping the powdered material, the material is extremely porous and exhibits a very large change in resistance between the electrodes 52 and 54 in the presence of a contaminated atmosphere. Furthermore, the surrounding metal casing 50 provides a high degree of mechanical strength. If desired, a heater may be utilized for heating the semiconductor block 56.

Figure 7:
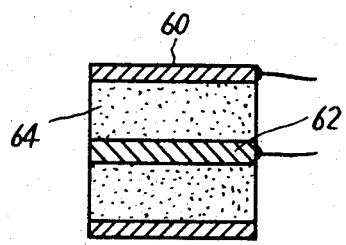
FIG. 7 is a cross-sectional view of FIG. 6 taken along the line 7—7 thereof.
Figure 6:
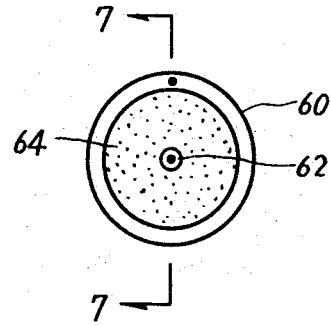
FIG. 6 is a side elevational view of a still further embodiment of the invention.

A further embodiment of a gas detecting device in accordance with the invention is illustrated in FIGS. 6 and 7. This form of the invention differs from the form of the invention shown in FIGS. 4 and 5 in that a single electrode 62 is embedded in the semiconductor material 64 and the casing 60 surrounding the semiconductor 64 is utilized as the second electrode. The semiconductor material 64 may be formed in the same manner as described in connection with the structure shown in FIGS. 4 and 5.

Figure 9:
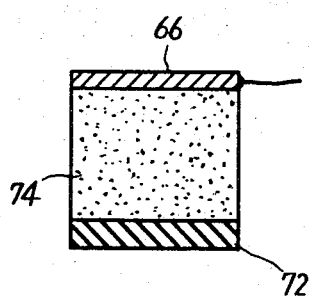
FIG. 9 is a cross-sectional view of FIG. 8 taken along the line 9—9 thereof.
Figure 8:
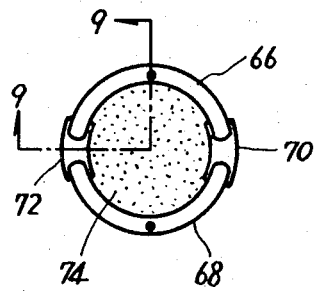
FIG. 8 is a side elevational view of still another embodiment of the invention.

A further embodiment of the invention is shown in FIGS. 8 and 9. In this embodiment, the metal oxide semiconductor block 74 is formed by a press-shaping process and is forced into a cylinder which is formed by bonding two semicylindrical metal electrodes 66 and 68 to insulators 70 and 72. The semiconductor material 74 may be formed in the same manner as previously described in connection with FIGS. 4 and 5 and affords a high degree of sensitivity to gas contaminated ambient air.

The several embodiments described above are for illustrative purposes only and various modifications and changes may be made without departing from the spirit and scope of the invention. For example, the electrode 62 of the embodiment shown in FIGS. 6 and 7 may be replaced by a single heater wire extending through the semiconductor material and also functioning as the electrode 62. The cylindrical housing 60 may be of cup shape. In all of the modifications, an alarm device is operated by utilizing the change of resistance of the metal oxide semiconductor material when it contacts a gas contaminated atmosphere.

The semiconductor materials 56, 64 and 74 may be formed in the same manner as the semiconductor material 4.

What is claimed is:

1. A gas detecting device comprising a porous and permeable metal oxide semiconductor body including semiconductor particles which exhibits a change in electroconductivity when it contacts a reducing gas in the air, and at least one pair of electrodes attached to said body and in electrical contact therewith, said body including particles of material selected from the group consisting of alumina and quartz.

2. A gas detecting device comprising a porous metal oxide semiconductor body including semiconductor particles which exhibits a change in electrical conductivity when it contacts a reducing gas in air, at least one pair of electrodes attached to said body and in electrical contact therewith, said metal oxide semiconductor body being contained within a casing with at least a portion of said body being exposed to air.

3. A gas detecting device, in accordance with claim 2 wherein said casing is made of metal and serves as one of said electrodes and the other of said electrodes is embedded in said body.

4. A gas detecting device comprising a porous metal oxide semiconductor body including semiconductor particles which exhibits a change in electrical conductivity when it contacts a reducing gas in air, at least one pair of electrodes attached to said body and in electrical contact therewith, said metal oxide semiconductor body being contained within a casing with at least a portion of the surface of said body being exposed to the air, said pair of electrodes being inserted in said metal oxide semiconductor body contained in said casing.

5. A gas detecting device, in accordance with claim 2 wherein said casing comprises two portions formed of metal with said portions being electrically insulated from each other and serve as electrodes.

6. A gas detecting device comprising a porous metal oxide semiconductor body including semiconductor particles which exhibits a change in electrical conductivity when it contacts a reducing gas in air, at least one pair of electrodes attached to said body and in electrical contact therewith, said metal oxide semiconductor body being in the form of a layer on the surface of an insulator.

7. A gas detecting device comprising a porous metal oxide semiconductor body including semiconductor particles which exhibits a change in electrical conductivity when it contacts a reducing gas in air, at least one pair of electrodes attached to said body and in electrical contact therewith, and heating means for said metal oxide semiconductor body to maintain it at a predetermined temperature.

* * * * *